United States Patent
Tao

(10) Patent No.: US 8,255,701 B2
(45) Date of Patent: Aug. 28, 2012

(54) FILE ENCRYPTION METHOD

(75) Inventor: Shao-Pu Tao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 409 days.

(21) Appl. No.: 12/624,935

(22) Filed: Nov. 24, 2009

(65) Prior Publication Data

US 2011/0040982 A1 Feb. 17, 2011

(30) Foreign Application Priority Data

Aug. 14, 2009 (CN) .......................... 2009 1 0305663

(51) Int. Cl.
*G06F 21/00* (2006.01)
(52) U.S. Cl. ........ 713/189; 455/466; 380/217; 709/236; 705/50
(58) Field of Classification Search ................... 713/189
See application file for complete search history.

(56) References Cited

U.S. PATENT DOCUMENTS

| | | | | |
|---|---|---|---|---|
| 4,538,225 A * | 8/1985 | Banks et al. | ................. | 715/206 |
| 4,597,082 A * | 6/1986 | Hill et al. | ...................... | 714/748 |
| 4,719,450 A * | 1/1988 | Yamauchi | ...................... | 341/62 |
| 5,615,379 A * | 3/1997 | Wehle | ............................ | 717/110 |
| 5,966,663 A * | 10/1999 | Gleason | ........................ | 455/466 |
| 6,397,259 B1 * | 5/2002 | Lincke et al. | ................. | 709/236 |
| 7,349,918 B2 * | 3/2008 | Azcona et al. | ................. | 707/718 |
| 7,890,747 B2 * | 2/2011 | Dempski et al. | ............. | 713/150 |
| 2004/0081434 A1 * | 4/2004 | Jung et al. | ........................ | 386/95 |
| 2004/0170277 A1 * | 9/2004 | Iwamura et al. | ............. | 380/217 |
| 2005/0160399 A1 * | 7/2005 | Kumar et al. | ................. | 717/104 |
| 2005/0243747 A1 * | 11/2005 | Rudolph | ....................... | 370/282 |
| 2007/0121830 A1 * | 5/2007 | Kasturi et al. | ............ | 379/93.27 |
| 2008/0229289 A1 * | 9/2008 | Nauman et al. | ............... | 717/136 |
| 2010/0042639 A1 * | 2/2010 | Grinshpun et al. | ........... | 707/101 |

OTHER PUBLICATIONS

Assembly Language Programming|http://ellard.org/dan/www/Courses/cs50-asm.pdf|Daniel J. Ellard|Sep., 1994.*

* cited by examiner

*Primary Examiner* — Taghi Arani
*Assistant Examiner* — Mahfuzur Rahman
(74) *Attorney, Agent, or Firm* — Altis Law Group, Inc.

(57) ABSTRACT

A file encryption method is provided. A first constant and a second constant are set. First one character of the first file is converted in a predetermined order to a first binary ASC code consisting of a high level and a low level. A logical exclusive OR is performed between the high level and the first constant to obtain a first result, and a logical exclusive OR is performed between the high level and the second constant to obtain a second result. A second binary ASC code is obtained. The second binary ASC code is converted to a second character. A second file is obtained.

8 Claims, 3 Drawing Sheets

FILE ENCRYPTION METHOD

BACKGROUND

1. Technical Field

The present disclosure relates to a file encryption method.

2. Description of Related Art

A plurality of testing programs is stored in a computer for electronic device testing. Typically, the testing program is available in writing, so anyone can easily revise it, even if they are not authorized.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
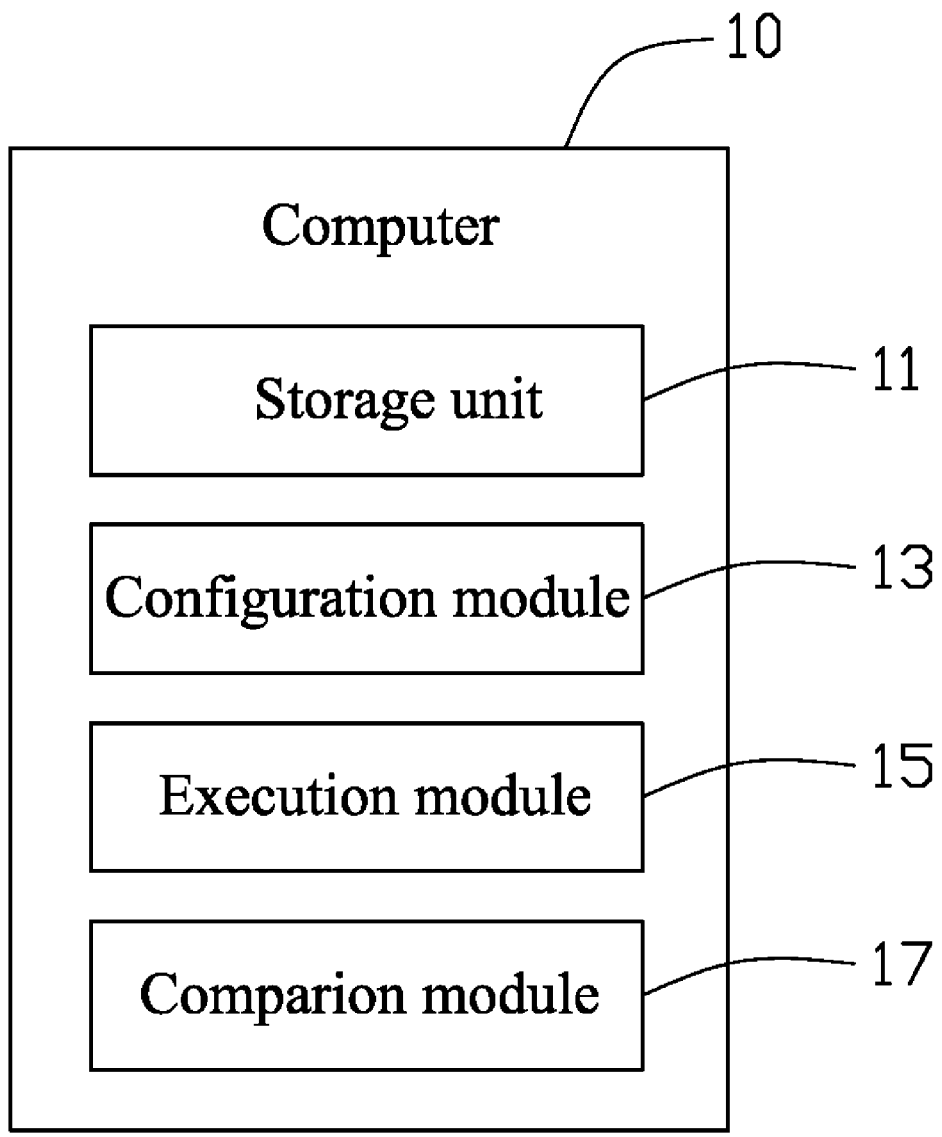
FIG. 1 is a block diagram of a computer utilizing an embodiment of a file encryption method disclosed.

Referring to FIG. 1, a computer 10 in accordance with an embodiment includes a storage unit 11, a configuration module 13, an execution module 15, and a comparison module 17.

The storage unit 11 is capable of storing a file for device testing. The file includes characters which comprise of a character that is selected from the group comprising of letters, numbers, punctuations, and symbols. The file may be an INI file, for example.

The configuration module 13 is capable of setting an American Standard Code (ASC) corresponding to the characters of the file in the storage unit 11, and determining a first constant C_H to logical high level exclusive OR operations and a second constant C_L to logical low level exclusive OR operations.

The comparison module 17 is capable of converting each character of the file in a predetermined order to an integer and then converting the integer to a binary ASC code. The predetermined order may be, for example, from the beginning to the end of the file, or from the end to the beginning of the files. The integer may be, for example, a decimal integer, or a hex integer.

The execution module 15 is capable of performing logical high level operations between each binary ASC code converted by the comparison module 17 and the first constant C_H to obtain a first result. The execution module 15 is further capable of performing logical low level operations between each binary string and the second constant C_L to obtain a second result, so as to obtain another binary ASC code consisting of the first and second results.

The table illustrates exemplary characters corresponding to decimal, hex, and binary ASC Codes:

| Character | ASC Code (decimal) | ASC Code (Hex) | ASC Code (Binary) |
|---|---|---|---|
| A | 65 | 41 | 01000001 |
| B | 66 | 42 | 01000010 |
| C | 67 | 43 | 01000011 |
| D | 68 | 44 | 01000100 |
| ... | ... | ... | ... |
| P | 80 | 50 | 01010000 |
| Q | 81 | 51 | 01010001 |
| R | 82 | 52 | 01010010 |
| S | 83 | 53 | 01010011 |
| T | 84 | 54 | 01010100 |
| U | 85 | 55 | 01010101 |
| ... | ... | ... | ... |
| Z | 90 | 5A | 01011010 |

Figure 2:
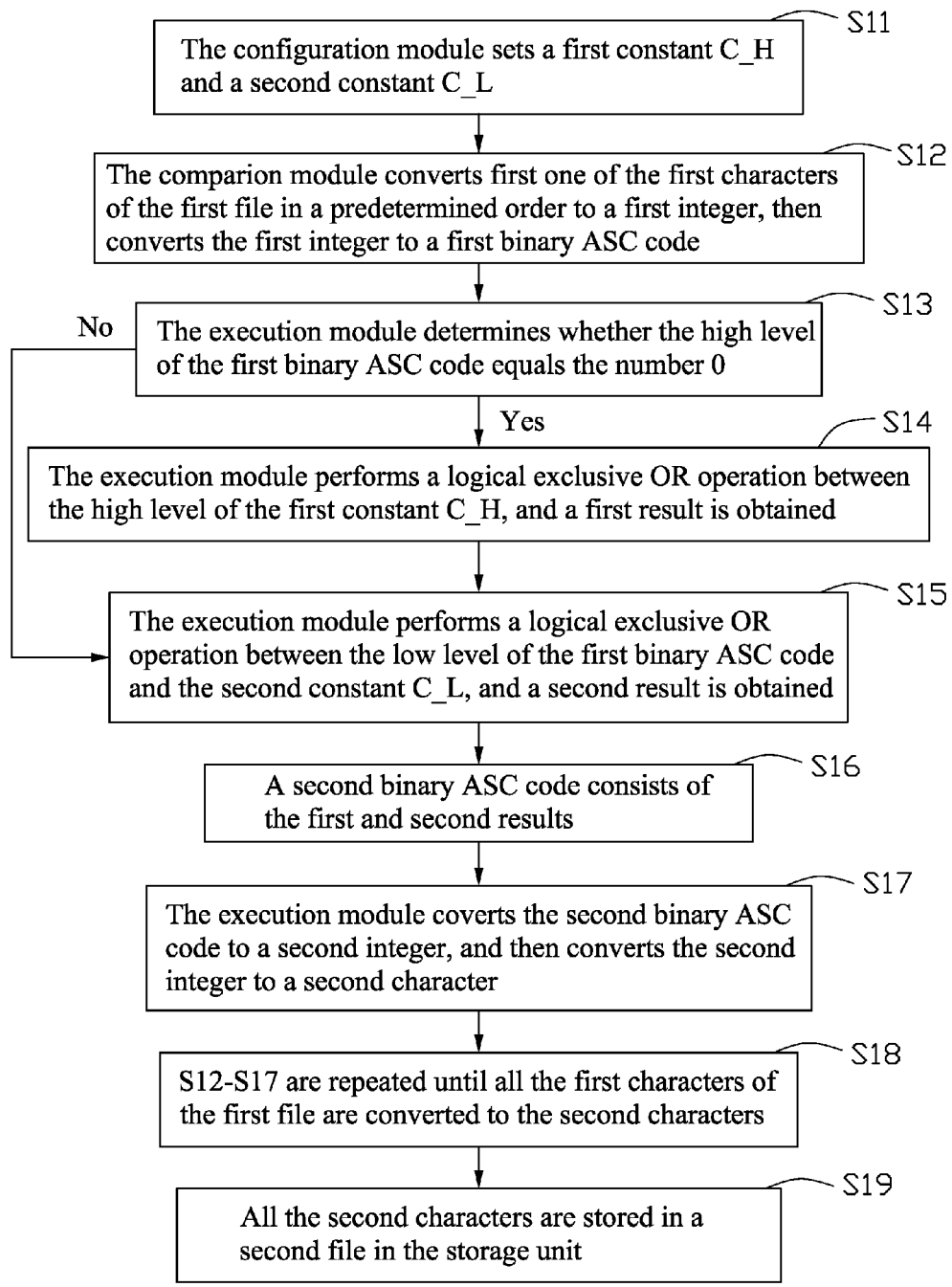
FIG. 2 is a flowchart of the file encryption method of FIG. 1.

FIG. 2 is a flowchart of an embodiment of the file encryption method of FIG. 1 applied to a first file in the storage unit 11.

In block S11, the configuration module 11 sets a first constant C_H for logical high level exclusive OR operations and a second constant C_L for logical low level exclusive OR operations. For example, the first constant C_H may be a hex integer 17, and the second constant C_L may be a hex integer 11.

In block S12, the comparison module 15 converts first one of the first characters of the first file in a predetermined order to a first integer, then converts the first integer to a first binary ASC code. For example, the first file can include characters ABCD, with the first, A, converted to a hex integer 41. The hex integer 41 is converted to the first binary ASC code 0100 0001. The high level of the first binary ASC code is 0100, and the low level thereof is 0001.

In block S13, the execution module 15 determines whether the high level of the first binary ASC code equals the number 0. If not, block S14 is performed. If the high level equals the number 0, block S15 is performed. For example, because the high level of the first binary ASC code is 0100, not equaling the number 0, block S14 is performed.

In block S14, the execution module 15 performs a logical exclusive OR operation between the high level of the first constant C_H, and a first result is obtained. For example, the high level of the first binary ASC code 0100 is exclusive OR with the first constant C_H 17, and the first result is 0101.

In block S15, the execution module 15 performs a logical exclusive OR operation between the low level of the first binary ASC code and the second constant C_L, and a second result is obtained. For example, the low level of the first binary ASC code 0001 is exclusive OR with the second the second constant C_L 11, and the second result 0000 is obtained.

In block S16, a second binary ASC code consists of the first and second results. For example, the second binary ASC code 01010000 consists of the first result 0101 and the second result 0000.

In block S17, the execution module 15 coverts the second binary ASC code to a second integer, and then converts the second integer to a second character. For example, the second binary ASC code 01010000 is converted to a second integer 50, and then the second integer 50 is converted to a second character P.

In block S18, S12-S14 are repeated until all the first characters of the first file are converted to the second characters. For example, the characters ABCD of the first file are converted to the second characters PSRU in the predetermined order, respectively.

In block S19, all the second characters are stored in a second file in the storage unit 11. For example, all the second characters PSRU are stored in the second file.

Figure 3:
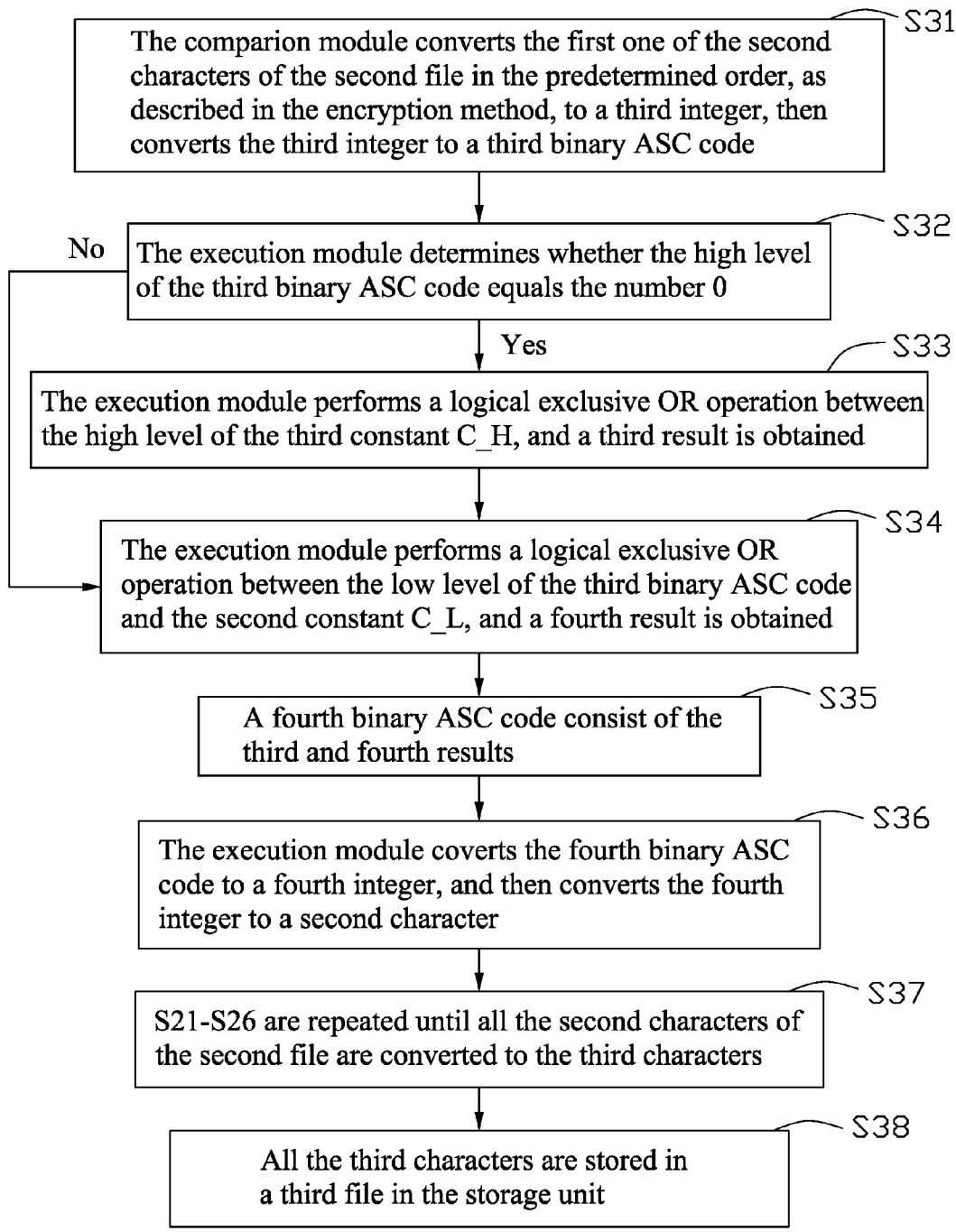
FIG. 3 is a flowchart of a decryption method for the file encryption method of FIG. 1.

FIG. 3 is a flowchart is an embodiment of a decryption method for the second file disclosed in the file encryption method in FIG. 2.

In block S31, the comparison module 15 converts the first of the second characters of the second file in the predetermined order, as disclosed in the encryption method, to a third integer, then converts the third integer to a third binary ASC code. For example, the second file includes characters PSRU. The first character, P, is converted to a hex third integer 50. The third hex integer 50 is converted to the third binary ASC code 01010000. The high level of the third binary ASC code is 0101, and the low level thereof is 0000.

In block S32, the execution module 15 determines whether the high level of the third binary ASC code equals the number 0. If not, block S33 is performed. If the high level equals the number 0, block S34 is performed. For example, because the high level of the first binary ASC code is 0101, not equaling the number 0, block S34 is performed.

In block S33, the execution module 15 performs a logical exclusive OR operation between the high level of the third constant C_H, and a third result is obtained. For example, the high level of the third binary ASC code 0101 is exclusive OR with the first constant C_H 17, and the third result is 0100.

In block S34, the execution module 15 performs a logical exclusive OR operation between the low level of the third binary ASC code and the second constant C_L, and a fourth result is obtained. For example, the low level of the third binary ASC code 0000 is exclusive OR with the second constant C_L 11, and the fourth result 0001 is obtained.

In block S35, a fourth binary ASC code consists of the third and fourth results. For example, the fourth binary ASC code 01000001 consists of the first result 0100 and the second result 0001.

In block S36, the execution module 15 coverts the fourth binary ASC code to a fourth integer, and then converts the fourth integer to a second character. For example, the fourth binary ASC code 01000001 is converted to a second integer 41, and then the second integer 41 is converted to a second character A.

In block S37, S31-S36 are repeated until all the second characters of the second file are converted to the third characters. For example, the characters PSRU of the second file are converted to the third characters ABCD in the predetermined order, respectively.

In block S38, all the third characters are stored in a third file in the storage unit 11. For example, all the third characters ABCD are stored in the second file.

After the second file is converted to the third file by the decryption method as described above, the third file matches the first file and all the third characters of the third file match all the first characters of the first files in the predetermined order.

In addition, in an embodiment, the characters of the first and second files can also be directly converted to binary ASC codes.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

Depending on the embodiment, certain of the steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A file encryption method for device testing files comprising first characters, the file encryption method comprising the following computer implemented steps:

(a) setting a first constant and a second constant by a configuration module;

(b) converting first one character of a first file in a predetermined order to a first integer, and the first integer to a first binary American Standard Code (ASC) code, which consists of a high level and a low level, by a comparison module;

(c) determining whether the high level of the first binary ASC code equals the number 0 by an execution module;

(d) performing a logical exclusive OR between the high level and the first constant to obtain a first result if the high level does not equal the number 0, and a logical exclusive OR between the low level and the second constant to obtain a second result, by the execution module;

(e) obtaining a second binary ASC code, which consists of the first and second results by the execution module;

(f) converting the second binary ASC code to a second integer and the second integer to a second character by the execution module;

(g) repeating steps (b), (c), (d), (e), and (f), except that the first character of the first file is changed to the second character in the predetermined order; and (h) obtaining a second file comprising all the second characters by the execution module;

wherein the first and second characters comprise of a character that is selected from a group comprising of letters, numbers, punctuations, and symbols; the first and second files are INI files; and a number of times steps (b), (c), (d), (e), and (f) are performed equals the number of the first characters of the first file.

2. The file encryption method of claim 1, wherein the first and second constants are integers.

3. The file encryption method of claim 1, wherein the first and second integers are hex integers.

4. The file encryption method of claim 1, wherein the first and second integers are decimal integer.

5. An encryption method for encrypting a first file comprising first characters for testing device, the encryption method comprising the following computer implemented steps:
   (a) setting a first constant and a second constant;
   (b) converting first one character of the first file in a predetermined order to a first binary American Standard Code (ASC) code, which consists of a high level and a low level;
   (c) performing a logical exclusive OR between the high level and the first constant to obtain a first result, and a logical exclusive OR between the low level and the second constant to obtain a second result;
   (d) acquiring a second binary ASC code, which consists of the first and second results;
   (e) converting the second binary ASC code to a second character;
   (f) repeating from steps (b), (c), (d), (e), and (f), except that the first one character of the first file is changed to the second one character in the predetermined order; and
   (g) obtaining a second file comprising all the second characters;
   wherein the first and second characters comprise of a character that is selected from a group comprising of letters, numbers, punctuations, and symbols; the first and second files are INI files; a number of times steps (b), (c), (d), (e), and (f) are performed equals the number of the first characters of the first file; determining whether the high level of the first binary ASC code equals the number 0 after the step (b); and performing the logical exclusive OR between the low level and the second constant only when the high level equals the number 0.

6. The encryption method of claim 5, wherein the first and second constants are integer.

7. The encryption method of claim 5, wherein the first and second integers are hex integers.

8. The encryption method of claim 5, wherein the first and second integers are decimal integer.

* * * * *